3,062,862
PRODUCTION OF DI-HYDROXYETHYL
TEREPHTHALATE
Harold W. Burns, Wenonah, and Robert D. Slockett, Woodbury, N.J., assignors to E. I. du Pont de Nemours and Company, Wilmington, Del., a corporation of Delaware
No Drawing. Filed Feb. 2, 1961, Ser. No. 86,595
6 Claims. (Cl. 260—475)

The present invention relates to an improved process for the recovery of bis($\beta$-hydroxyethyl) terephthalate from mixtures formed by the reaction of terephthalic acid with ethylene oxide in an aqueous medium containing a soluble base.

Bis($\beta$-hydroxyethyl) trephthalate is used in the production of polyethylene terephthalate, an important polyester for the manufacture of fibers and films. One method of producing bis($\beta$-hydroxyethyl) terephthalate comprises reacting terephthalic acid with ethylene oxide in an aqueous medium and in the presence of sodium hydroxide at elevated temperature. The product mixture contains a preponderant amount of bis($\beta$-hydroxyethyl) terephthalate, and, in addition, some mono($\beta$-hydroxyethyl) terephthalate, disodium terephthalate, sodium mono($\beta$-hydroxyethyl) terephthalate, and unreacted terephthalic acid. Normally, the diester is recovered from the reaction mixture by filtering off any solid material (unreacted terephthalic acid) from the hot mixture, and allowing the filtrate to cool, whereupon much of the diester, together with a minor amount of the monoester, crystallizes out. This recovery method is inefficient on two counts: (1) an insufficient amount of the diester present in the reaction mixture crystallizes and is separated out, and (2) considerable quantities of terephthalic acid values, i.e., terephthalic acid and its disodium salt, the monoester and its sodium salt, and the diester, remain in the liquor after the crystallized diester has been separated from the reaction mixture.

While methods have been proposed for treating the impure crystallized bis($\beta$-hydroxyethyl) terephthalate product so as to purify it, no method has heretofore been advanced to provide greater recovery of the diester, nor has the liquor obtained after the initial separation of the crystallized diester been utilized as a valuable source of terephthalic acid and its esters.

We have now found that the amount of bis($\beta$-hydroxyethyl) terephthalate which is recovered from mixtures obtained from the above-described reaction of terephthalic acid with ethylene oxide can be increased considerably by acidifying either (1) the reaction mixture prior to crystallization of diester, or (2) the liquor remaining after separation of crystallized diester from the reaction mixture to make possible additional crystallization of diester from said liquor. Any water-soluble inorganic acid can be used to carry out the acidification. Sulfuric acid and hydrochloric acid are the preferred inorganic acids because of economy and availability. Sufficient acid is used to reduce the pH to not above about 3. Preferably a pH of 1.5 to 3 is used. A lower pH can be used but no additional advantage results.

Thus, the process of the invention provides a means of recovering considerably larger amounts of bis($\beta$-hydroxyethyl) terephthalate from terephthalic acid-ethylene oxide reaction mixtures than has heretofore been possible. For example, the present process gives about a 12% increase in the amount of the diester which crystallizes out when the reaction mixture is acidified prior to crystallization of any diester. At the same time, about 71% more of the monoester is obtained. Thus, the process effects a 22–23% increase in the total amount of esters recovered in the initial crystallization.

Also, the process of the invention makes possible the recovery of added amounts of bis($\beta$-hydroxyethyl) terephthalate as well as mono($\beta$-hydroxyethyl) terephthalate and unreacted terephthalic acid by acidification of the mother liquor remaining after an initial separation of crystallized diester from the reaction mixture. Heretofore, the terephthalic acid and esterified products thereof present in the mother liquor remained unrecovered and represented a considerable economic loss. As illustrated by Example 3, more than 96% of the diester present in the mother liquor can be recovered by the present process. In addition, 80% of the monoester and all of the unreacted terephthalic acid is recovered. This represents a total recovery of the terephthalic acid values (acid, monoester, and diester) in the filtrate of nearly 88% and a considerable saving in process costs inasmuch as the recovered materials can be recycled back to the esterification reactor. If desired, the diester recovered with the acid and monoester can be separated out and removed prior to recycling of the recovered material.

The temperature at which the acid is added to the reaction mixture, either prior to or after an initial separation of bis($\beta$-hydroxyethyl) terephthalate therefrom, has no critical effect on the amount of diester recoverable by the present process. However, acidification at temperatures within the range of 65° to 95° C. results in a terephthalic acid-containing solid material of larger crystal size than does acidification at lower temperatures. Therefore, we prefer to carry out the acidification at a temperature within the 65–95° C. range. For ease of filtration of any terephthalic acid-containing solid, it is also preferable that the reaction mixture be held at a temperature within the preferred acidification temperature range for at least about fifteen minutes.

In order to obtain efficient precipitation and separation of the desired diester, the acidified reaction mixture or the acidified mother liquor remaining after an initial separation of crystallized diester is cooled to a temperature of approximately 45° C. or lower, preferably 20–30° C., and the precipitate filtered off at a temperature within this range. While lower temperatures can be used, any advantage which may be gained with respect to greater product separation may be offset by higher cooling costs.

The following examples illustrate specific embodiments of the process of the invention. The parts in the examples are parts by weight.

*Example 1*

Terephthalic acid (369.8 parts), 16.7 parts of sodium hydroxide, and 1000 parts of water were charged to a stainless steel autoclave equipped with an agitator. The agitator was set into operation, the autoclave and its contents were heated to and maintained at 100° C., and 187.4 parts of ethylene oxide was pumped into the autoclave. The temperature of 100° C. was maintained for ten minutes after the pressure had become constant. The reaction mixture then was cooled to 70° C. and diluted with 2000 parts of water. Analysis of the reaction mixture showed the presence of 239.6 parts of bis($\beta$-hydroxyethyl) terephthalate, 43.2 parts of mono-($\beta$-hydroxyethyl) terephthalate, 136.0 parts of terephthalic acid, 24.4 parts of sodium mono($\beta$-hydroxyethyl) terephthalate, and 21.0 parts of disodium terephthalate.

Twenty-six parts of concentrated sulfuric acid was added to the diluted reaction mixture to 70° C. to give a pH of 3. The solid material present in the mixture was filtered off at 70° C. and washed with 400 parts of hot water. The wash water and filtrate were combined. The solid material on the filter contained 152.8 parts of terephthalic acid and 6.0 parts of mono($\beta$-hydroxyethyl)

terephthalate, both of which compounds could be reused for reaction with ethylene oxide.

The liquid consisting of the combined wash water and filtrate was cooled to 25° C. to precipitate solid material therefrom; the solid material was filtered off at 25° C. and washed with 800 parts of water. The solid product contained 221.4 parts of bis(β-hydroxyethyl) terephthalate and 52.8 parts of mono(β-hydroxyethyl) terephthalate. Thus, 92.4% of the diester originally present in the reaction mixture was recovered; 80.9% of the monoester was recovered (from the monoester and the sodium salt of the monoester originally present); and the total ester recovery was 90.0%.

Analysis of the filtrate obtained from the 25° C. filtration showed the presence of 18.2 parts of the diester, 10.2 parts of the monoester, and 37.6 parts of sodium sulfate.

In order to examine the suitability of the recovered ester product for polyester formation, the following experiment was carried out:

The solid ester product recovered from the 25° C. filtration was recrystallized from four times its weight of water, filtered off, and the filter cake washed with 400 parts of water at 25° C. The product was dried at 80° C. for 12 hours after which time it was heated in 11 parts of ethylene glycol at 285° C. in the presence of antimony trioxide for 3 hours to give polyethylene terephthalate. The polyester was white, and had an intrinsic viscosity of 0.65.

For comparison, the procedure of Example 1 was repeated with the exception that sulfuric acid was not added to the reaction mixture. The recovered ester product comprised 193.2 parts of bis(β-hydroxyethyl) terephthalate and 13.0 parts of mono(β-hydroxyethyl) terephthalate. Thus, 80.7% of the diester originally present in the reaction mixture was recovered; 10.0% of the monoester was recovered (from the monoester and the sodium salt of the monoester originally present); and the total ester recovery was only 67.6%.

*Example 2*

Terephthalic acid was reacted with ethylene oxide by the procedure described in Example 1. The solid material in the reaction mixture (essentially terephthalic acid) was filtered off at 70° C., and the filtrate was cooled to 25° C. to precipitate bis(β-hydroxyethyl) terephthalate and a minor amount of mono(β-hydroxyethyl) terephthalate. The precipitate was filtered off at 25° C. and washed with water.

The liquid consisting of the combined wash water and filtrate (1000 parts) contained the following: 11 parts of bis(β-hydroxyethyl) terephthalate, 35 parts of mono(β-hydroxyethyl) terephthalate, 34 parts of disodium terephthalate, 33 parts of sodium mono(β-hydroxyethyl) terephthalate, 23.7 parts of ethylene glycol, 1 part of diethylene glycol, and 862.3 parts of water. This liquid was diluted with 750 parts of a liquid mixture comprised of 717 parts of water, 20 parts of ethylene glycol, 12 parts of mono(β-hydroxyethyl) terephthalate, and 1 part of bis(β-hydroxyethyl) terephthalate. This liquid mixture served merely as a diluent to aid in the subsequent filtration. Seventeen parts of concentrated sulfuric acid was then added at 70° C. to give a pH of 2, the mixture being agitated during the sulfuric acid addition. The mixture then was heated to 95° C. and filtered at that temperature. The filter cake comprised 28.1 parts of terephthalic acid and 5.0 parts of mono(β-hydroxyethyl) terephlate. The filtrate was cooled to 25° C., whereupon a solid crystallized out. The solid, which was filtered off, comprised 10.6 parts of bis(β-hydroxyethyl) terephthalate and 46.1 parts of mono(β-hydroxyethyl) terephthalate, wet with ethylene glycol and water. Thus, 96.4% of the diester present in the filtrate obtained upon filtering the crude diester was recovered. Also, 80% of the monoester present in this filtrate (as the ester and as its sodium salt) was recovered (and 100% of the terephthalic acid originally present as the disodium salt was recovered. Therefore, the recovery of total esters and terephthalic acid was 87.8%.

The filtrate obtained by filtering off the solid which crystallized out at 25° C. contained 1.1 part of bis(β-hydroxyethyl) terephthalate, 12.4 parts of mono(β-hydroxyethyl) terephthalate, 21.2 parts of ethylene glycol, and 787.6 parts of water. This filtrate could be used as a diluent in a subsequent recovery procedure.

The temperature at which the acid is added, while having no significant effect on the amount of bis(β-hydroxyethyl) terephthalate recovered by the present process, does have a noticeable effect on the filterability of the product mixture, as is shown by the following examples.

A liquid (filtrate and wash water) obtained by filtering off bis(β-hydroxyethyl) terephthalate and a minor amount of mono(β-hydroxyethyl) terephthalate at 25° C. from a terephthalic acid-ethylene oxide reaction product as described in Example 2 and diluted as described in Example 2 was treated with concentrated sulfuric acid at different temperatures to give a pH of 3. In each case the acid was added over a period of 30 minutes, the acidified mixture was held at the acidification temperature for an additional 30 minutes, cooled to 28° C., and filtered under vacuum.

The conditions and results are given in the following table:

| Example | Acidification temp. (° C.) | Cooling Time (min.) | Filtration rate (lb. dry cake/hr./sq. ft. of filtration area) | Percent Recovery of total esters and terephthalic acid |
|---|---|---|---|---|
| 3 | 90 | 20 | 16.6 | 85.3 |
| 4 | 70 | 20 | 54.6 | 91.9 |
| 5 | 50 | 15 | 37.4 | 88.2 |
| 6 | 30 | 0 | 17.3 | 92.9 |

The invention has been described in detail in the foregoing. It will be apparent to those skilled in the art that many variations are possible without departure from the scope of the invention. We intend, therefore, to be limited only by the following claims.

We claim:

1. In a process for the recovery of bis(β-hydroxyethyl) terephthalate from a mixture formed by the reaction of terephthalic acid with ethylene oxide in an aqueous medium containing a soluble alkali metal base, the steps comprising lowering the pH of said mixture to not more than about 3 by mixing said mixture with an acid selected from the group consisting of hydrochloric acid and sulfuric acid, and thereafter crystallizing and separating bis(β-hydroxyethyl) terephthalate from said acidified mixture.

2. In a process for the recovery of bis(β-hydroxyethyl) terephthalate from a mixture formed by the reaction of terephthalic acid with ethylene oxide in an aqueous medium containing a soluble alkali metal base, the steps comprising mixing said mixture at a temperature within the range of 65° to 95° C. with an acid selected from the group consisting of hydrochloric acid and sulfuric acid, to reduce the pH of said mixture to not more than about 3, separating from the mixture any solid material present, cooling the remaining liquid to a temperature in the range of 20° C. to 30° C., and separating from the mixture thus formed the solid material present therein.

3. In a process for the recovery of bis(β-hydroxyethyl) terephthalate from a mixture formed by the reaction of terephthalic acid with ethylene oxide in an aqueous medium containing a soluble alkali metal base, the steps comprising separating from said mixture any solid material present therein at a temperature within the range of 65° to 95° C., cooling the remaining liquid to a temperature within the range of 20° to 30° C., separating from the mixture thus formed the solid material present therein, mixing the remaining liquid at a temperature within the range of 65° to 95° C. with an acid selected from the group consisting of hydrochloric acid and sulfuric acid, to reduce the pH of said liquid to not more than about 3, cooling said mixture to a temperature within the range of 20° to 30° C., and separating from said mixture the solid material present therein.

4. A process according to claim 3 wherein any solid material present in the mixture formed after addition of said acid is separated out prior to cooling of said mixture to a temperature within the range of 20° to 30° C.

5. In a process for the recovery of bis($\beta$-hydroxyethyl) terephthalate from a mixture formed by the reaction of terephthalic acid with ethylene oxide in an aqueous medium containing a soluble alkali metal base, the steps comprising lowering the pH of said mixture to not more than about 3 by mixing said mixture with hydrochloric acid and thereafter crystallizing and separating bis($\beta$-hydroxyethyl) terephthalate from said acidified mixture.

6. In a process for the recovery of bis($\beta$-hydroxyethyl) terephthalate from a mixture formed by the reaction of terephthalic acid with ethylene oxide in an aqueous medium containing a soluble alkali metal base, the steps comprising lowering the pH of said mixture to not more than about 3 by mixing said mixture with sulfuric acid and thereafter crystallizing and separating bis($\beta$-hydroxyethyl) terephthalate from said acidified mixture.

References Cited in the file of this patent

FOREIGN PATENTS 623,669   Great Britain _____ May 20, 1949